US012696880B2

(12) United States Patent
Paxton

(10) Patent No.: US 12,696,880 B2
(45) Date of Patent: Aug. 4, 2026

(54) FREE-STANDING POND

(71) Applicant: Interpet Ltd, Dorking (GB)

(72) Inventor: Andrew Paxton, Taunton (GB)

(73) Assignee: Sera Werke Heimtierbedarf J. Ravnak GMBH & Co.KG, Heinsburg (DE)

( * ) Notice: Subject to any disclaimer, the term of this patent is extended or adjusted under 35 U.S.C. 154(b) by 0 days.

(21) Appl. No.: 18/888,847

(22) Filed: Sep. 18, 2024

(65) Prior Publication Data

US 2025/0089688 A1 Mar. 20, 2025

(30) Foreign Application Priority Data

Sep. 18, 2023 (GB) ...................................... 2314239

(51) Int. Cl.
A01K 61/00 (2017.01)
A01K 63/00 (2017.01)

(52) U.S. Cl.
CPC ............ A01K 61/00 (2013.01); A01K 63/006 (2013.01)

(58) Field of Classification Search
CPC ...... E04H 4/144; A01K 63/006; A01K 61/00; A01K 29/00; E04F 11/00
See application file for complete search history.

(56) References Cited

U.S. PATENT DOCUMENTS 3,141,442 A * 7/1964 Harris .................. A01K 63/006
441/35
3,699,921 A * 10/1972 Janicek ................ A01K 63/006
119/246
3,786,781 A * 1/1974 Poulsen ............... A01K 63/006
119/246
3,804,064 A * 4/1974 Kuneman ............ A01K 63/006
119/246
4,972,540 A * 11/1990 Phelps .................. A01K 29/00
14/71.3

(Continued)

FOREIGN PATENT DOCUMENTS

CN 205233181 5/2016
CN 205567519 9/2016

(Continued)

OTHER PUBLICATIONS

Ecjiuyi "Turtle Rocks for Tank, Stone for Aquatic Turtle Tank, Turtle Tank Landscaping Ornament Basking Platform Accessories Supplies" Oct. 20, 2021, Amazon. com https://www.amazon.com/Platform-Tortoise-Climbing-Aquarium-Landscaping/dp/B09JVHWCMJ (Year: 2021).*

(Continued)

*Primary Examiner* — Katelyn T Truong
(74) *Attorney, Agent, or Firm* — Alley IP

(57) ABSTRACT

A free-standing pond (10) is provided to allow access to the pond by wildlife, the pond comprising a first staircase (50) leading up the outside of the pond, and a second staircase (70) leading down the inside of the pond, wherein a crossing area (60, 62) is provided joining the top of the first and second staircases, and wherein the depth of the treads (72) of the second staircase are substantially greater than the depths of the treads (52) of the first staircase, and wherein at least some of the treads (52) of the first staircase are arranged to be grippable, in use, by wildlife such as frogs.

13 Claims, 5 Drawing Sheets

(56) References Cited

U.S. PATENT DOCUMENTS

| | | | | | |
|---|---|---|---|---|---|
| 5,135,400 | A | * | 8/1992 | Ramey | A01K 63/003 |
| | | | | | 119/482 |
| 5,320,568 | A | * | 6/1994 | Koerkel, Jr. | A01K 61/00 |
| | | | | | 441/29 |
| 5,693,220 | A | * | 12/1997 | Sceusa | A01K 63/042 |
| | | | | | 119/268 |
| 5,862,541 | A | * | 1/1999 | Mailhot | A01K 29/00 |
| | | | | | 119/221 |
| 6,073,583 | A | * | 6/2000 | Cumming | A01K 7/00 |
| | | | | | 119/72 |
| 6,397,780 | B1 | * | 6/2002 | Youngstrom | A01K 63/003 |
| | | | | | 119/248 |
| 6,532,899 | B1 | * | 3/2003 | Hootman | A01K 63/006 |
| | | | | | 119/253 |
| 6,643,879 | B1 | * | 11/2003 | Davis | A01K 1/035 |
| | | | | | 14/69.5 |
| 6,843,910 | B1 | * | 1/2005 | Thomas | A01K 63/045 |
| | | | | | 210/167.01 |
| 8,413,607 | B2 | * | 4/2013 | Gamez | A01K 39/02 |
| | | | | | 119/74 |
| 9,992,980 | B2 | * | 6/2018 | Tominaga | A01K 1/03 |
| 10,172,329 | B2 | * | 1/2019 | Szot | A01K 61/00 |
| 10,240,359 | B1 | * | 3/2019 | Sirco | E04H 4/144 |
| 12,114,646 | B2 | * | 10/2024 | Mihlbauer | A01K 63/006 |

| | | | | | |
|---|---|---|---|---|---|
| 2009/0308003 | A1 | | 12/2009 | Juneau et al. | |
| 2010/0223845 | A1 | * | 9/2010 | Felling | A01K 63/006 |
| | | | | | 248/157 |
| 2013/0334113 | A1 | * | 12/2013 | Erlich | E04H 4/1263 |
| | | | | | 210/167.1 |
| 2021/0227804 | A1 | * | 7/2021 | Huffman | A01K 1/035 |
| 2022/0243488 | A1 | * | 8/2022 | Eckhardt | E04H 4/1218 |

FOREIGN PATENT DOCUMENTS

| | | | | | |
|---|---|---|---|---|---|
| CN | 206034396 | U | * | 3/2017 | |
| CN | 206333212 | | | 7/2017 | |
| DE | 19619619 | A1 | * | 11/1996 | A01K 29/00 |
| DE | 102015205792 | A1 | * | 10/2016 | E01B 26/00 |

OTHER PUBLICATIONS

Muyg, "Resin Turtle Basking Platform, Turtles . . . Stone Habitat Decoration for Small Lizards, Frogs, Snakes, Chameleon" Sep. 10, 2022, Amazon.com https://www.amazon.com/MUYG-Platform-Terrariums-Decoration-Chameleon/dp/BOB9QVLT (Year: 2022).*
UK IPO, Search Report in Corresponding GB Application 2314239. 1, Mar. 15, 2024.
INPI, Preliminary Search Report in corresponding FR application 2409703, Mar. 31, 2026.

* cited by examiner

FREE-STANDING POND

RELATED APPLICATIONS

This application claims priority under 35 U.S.C. § 119 to GB Application 2314239.1, filed Sep. 18, 2023. This GB application is incorporated by reference herein in its entirety.

FIELD

The present invention relates generally to a free-standing pond and finds particular, although not exclusive, utility in encouraging and enabling access to the pond by wildlife such as frogs and newts.

BACKGROUND

Typical garden ponds are arranged within the ground such that the top of the sides of the pond are substantially level with the surrounding ground. In such situations wildlife such as frogs and newts are relatively easily able to enter and exit the water within the pond. However, free-standing ponds, which are now a popular garden item, have the top of their sides at a relatively substantial height above the surrounding ground which makes it relatively difficult for wildlife such as frogs and newts to enter and exit the water within the pond.

It is desirable to enable wildlife such as frogs and newts to enter and exit the water within free-standing ponds.

SUMMARY

In a first aspect, the present invention provides a free-standing pond, for allowing access to the pond by frogs, comprising a first staircase leading up the outside of the pond, and a second staircase leading down the inside of the pond, wherein a crossing area is provided joining the top of the first and second staircases, and wherein the depth of the treads of the second staircase are substantially greater than the depths of the treads of the first staircase, and wherein at least some of the treads of the first staircase are arranged to be grippable by frogs, in use.

For instance, the free-standing pond may include frog access means, wherein the frog access means may comprise a first staircase leading up the outside of the pond, and a second staircase leading down the inside of the pond, wherein a crossing area may be provided joining the top of the first and second staircases, and wherein the depth of the treads of the second staircase may be substantially greater than the depths of the treads of the first staircase, and wherein the first staircase may include gripping means on at least some of the treads.

Although ramps are known for reaching the top of the sides of ponds, they tend to have relatively shallow gradients and thus occupy a relatively large amount of space around the pond. Such relatively shallow pitched ramps are typically aimed at birds, such as ducks. However, the free-standing pond described herein is aimed at smaller wildlife such as frogs, newts, mice, voles, insects, beetles and the like. These creatures are substantially smaller than ducks and do not require relatively shallow pitched ramps. Accordingly, the pitch of the first staircase may lie in the range 30 to 60 degrees above the horizontal (in use). The pitch of the first staircase may lie in the range 45 to 60 degrees above the horizontal (in use). The pitch of the first staircase may lie in the range 50 to 60 degrees above the horizontal (in use). The pitch of the first staircase may be approximately 55 degrees above the horizontal (in use).

Also, such creatures do not require relatively deep treads on the stairs, and accordingly, the treads of the first staircase may have a depth in the range of 5 to 15 mm. The depth may be 5 to 10 mm.

Also, such creatures require relatively short risers on the stairs, and accordingly, the risers of the first staircase may have a height in the range of 10 to 25 mm. The height may be 5 to 10 mm.

The second staircase, arranged inside the side walls of the pond may be used to reach the water within the pond both by small creatures such as frogs and newts but also by larger wildlife such as birds. Accordingly, the treads on this second staircase are deeper than the first staircase and may lie in the range 15 to 30 mm.

The risers of the second staircase may have a height in the range of 10 to 25 mm. The height may be 5 to 10 mm.

The pitch of the second staircase may lie in the range 25 to 35 degrees above the horizontal (in use). The pitch of the second staircase may be approximately 30 degrees above the horizontal (in use).

At least some of the treads of the second staircase may be arranged to be grippable by frogs, in use. In one example, the second staircase may include gripping means on at least some of the treads. This may enable frogs and newts to use their fingers and toes to grip the steps as they climb up or down the stairs. The treads may include planar surfaces and an indentation in the planar surfaces arranged behind, and adjacent, the noses of the treads. In one example, the treads may include planar surfaces and the gripping means may include an indentation in the planar surfaces arranged behind, and adjacent, the noses of the treads. The indentation may be a groove arranged along the edge of the treads. The depth of the indentation may be in the range 1 to 4 mm.

The free-standing pond may further comprise a barrier along the outside edge of the first staircase. This may have a height of approximately 10 to 20 mm as measured vertically up from the nose of the treads.

Likewise, the free-standing pond may further comprise a barrier along the outside edge of the crossing area. This may have a height of approximately 10 to 20 mm as measured vertically up from the nose of the treads.

The barriers may assist in preventing wildlife from falling off the staircase in use.

The first and second staircase, the crossing area, and the barrier may all be arranged to be releasably connectable to one another. This may allow the free-standing pond to be packed into a relatively small box for assembly by a customer.

The free-standing pond may further comprise a planter inside the pond and adjacent the second staircase. This may comprise a basket-like member arranged to be at least partially below the water level in use. Aquatic plants may be planted in the planter, in use, to encourage wildlife to visit the pond.

The planter may also be releasably connectable to the first and second staircase, the crossing area, and the barrier.

In this regard, the term "releasably connectable" may include the use of corresponding tabs and sockets, screws, bolts, friction fit connections and other such features.

The free-standing pond may further comprise modular side walls, a liner and a fountain.

BRIEF DESCRIPTION OF THE DRAWINGS

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

DETAILED DESCRIPTION

Figure 1:
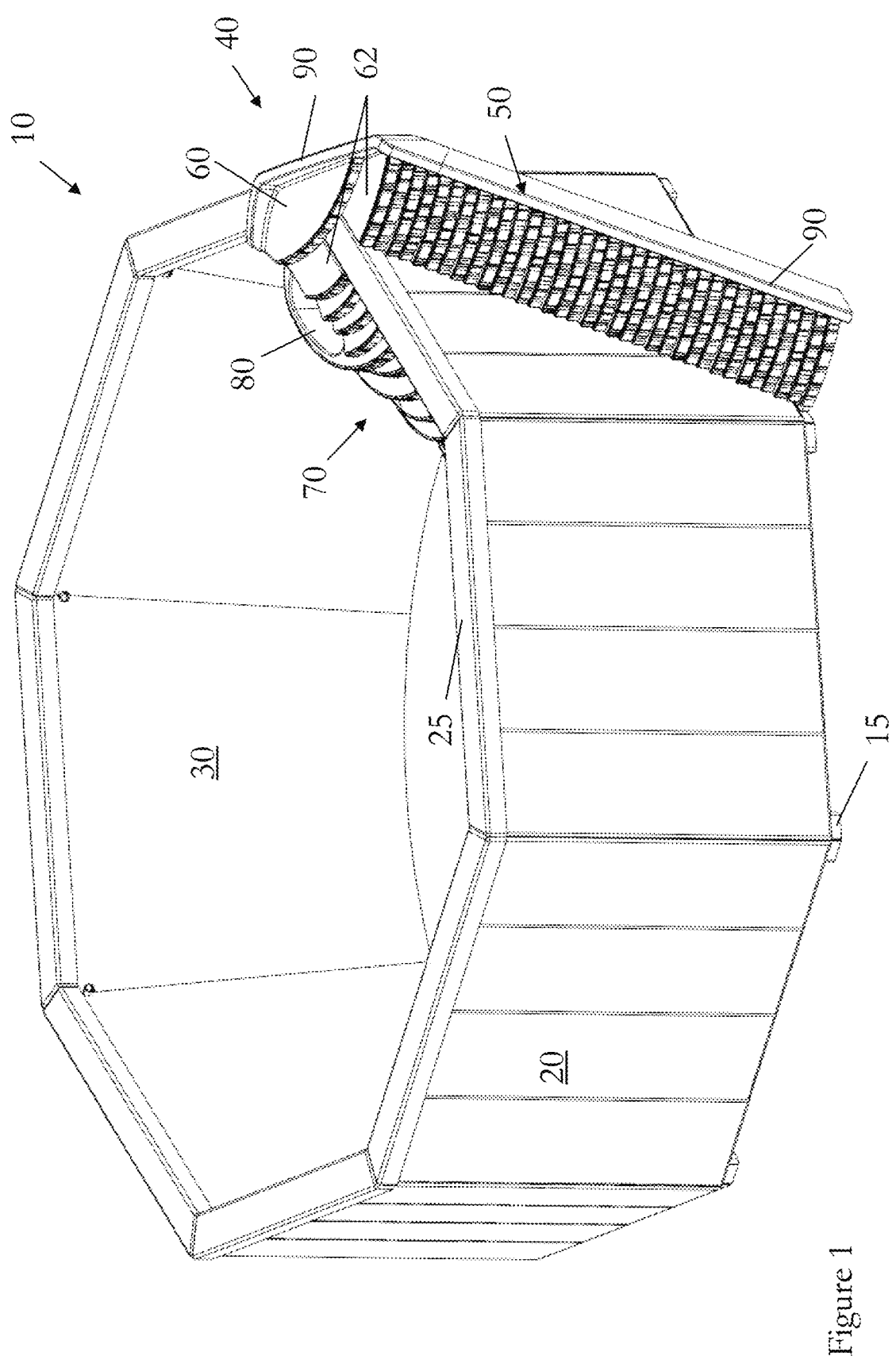
FIG. 1 is a perspective view of a free-standing pond.

The present invention will be described with respect to certain drawings but the invention is not limited thereto but only by the claims. The drawings described are only schematic and are non-limiting. Each drawing may not include all of the features of the invention and therefore should not necessarily be considered to be an embodiment of the invention. In the drawings, the size of some of the elements may be exaggerated and not drawn to scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that operation is capable in other sequences than described or illustrated herein. Likewise, method steps described or claimed in a particular sequence may be understood to operate in a different sequence.

Moreover, the terms top, bottom, over, under and the like in the description and the claims are used for descriptive purposes and not necessarily for describing relative positions. It is to be understood that the terms so used are interchangeable under appropriate circumstances and that operation is capable in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "an embodiment" or "an aspect" means that a particular feature, structure or characteristic described in connection with the embodiment or aspect is included in at least one embodiment or aspect of the present invention. Thus, appearances of the phrases "in one embodiment", "in an embodiment", or "in an aspect" in various places throughout this specification are not necessarily all referring to the same embodiment or aspect, but may refer to different embodiments or aspects. Furthermore, the particular features, structures or characteristics of any one embodiment or aspect of the invention may be combined in any suitable manner with any other particular feature, structure or characteristic of another embodiment or aspect of the invention, as would be apparent to one of ordinary skill in the art from this disclosure, in one or more embodiments or aspects.

Similarly, it should be appreciated that in the description various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Moreover, the description of any individual drawing or aspect should not necessarily be considered to be an embodiment of the invention. Rather, as the following claims reflect, inventive aspects lie in fewer than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some features included in other embodiments, combinations of features of different embodiments are meant to be within the scope of the invention, and form yet further embodiments, as will be understood by those skilled in the art. For example, in the following claims, any of the claimed embodiments can be used in any combination.

In the description provided herein, numerous specific details are set forth. However, it is understood that embodiments of the invention may be practised without these specific details. In other instances, well-known methods, structures and techniques have not been shown in detail in order not to obscure an understanding of this description.

In the discussion of the invention, unless stated to the contrary, the disclosure of alternative values for the upper or lower limit of the permitted range of a parameter, coupled with an indication that one of said values is more highly preferred than the other, is to be construed as an implied statement that each intermediate value of said parameter, lying between the more preferred and the less preferred of said alternatives, is itself preferred to said less preferred value and also to each value lying between said less preferred value and said intermediate value.

The use of the term "at least one" may mean only one in certain circumstances. The use of the term "any" may mean "all" and/or "each" in certain circumstances.

The principles of the invention will now be described by a detailed description of at least one drawing relating to exemplary features. It is clear that other arrangements can be configured according to the knowledge of persons skilled in the art without departing from the underlying concept or technical teaching, the invention being limited only by the terms of the appended claims.

In FIG. 1, a free-standing pond 10 is shown including eight abutting outer side walls 20 forming an octagonal shape. A waterproof liner 30 is arranged inside the walls so that the pond may retain water, in use, when filled. The pond is raised on feet 15. The top of the side walls 20 form a substantially continuous rail 25 around the circumference of the pond. The pond may have a width of approximately one metre, and a height of approximately 365 mm.

As the sides 20 of the pond 10 are sheer-sided, being substantially vertical, it is difficult for smaller creatures, such as frogs, to reach the water inside the pond. Accordingly, a first set of outside steps 50 is arranged on the outside of one side wall 20. The outside steps are arranged to reach the ground level on which the pond sits in use, although a relatively small gap may exist which would not inhibit access by wildlife.

The outside steps 50 reach the top of the rail 25. On the inside of the pond 10, on the other side of the side wall 20 against which the steps 50 are arranged, is a second, inside set of steps 70. This inside set of steps 70 extends to the top of the rail 25, but does not extend to the bottom of the inside of the pond. This is because it is unnecessary for them to do so. This is because the water level of the pond is likely to be maintained at a height higher than the lowest step of the inside set of steps 70. Accordingly, wildlife need only descend a few steps to reach the water.

In use, wildlife may cross the rail 25, from the outside set of steps 50, to reach the inside set of steps 70. In this regard, the step which has its tread level with the top of the rail 25 has a substantially deeper tread than the other steps. This is true for both the inside and outside sets of steps. These treads may act as a first crossing area 62. However, a second crossing area 60 is shown arranged across the top of, and straddling, the rail 25 linking the inside and outside sets of steps. This second crossing area 60 is formed by another step above the top of the steps which are level with the top of the rail 25.

This second crossing area 60 may be arranged to be large enough for birds to land on before descending the inside steps to reach the water.

A planter 80 is shown located on the side of the inside set of steps 70 towards the centre of the pond 10.

A barrier 90 is shown extending up along the side of radially outer edge of the first set of steps 50, and the radially outer edge of the second crossing area 60. This barrier may have a height sufficient to prevent smaller creatures from falling off the first set of steps in case their grip fails.

Figure 2:
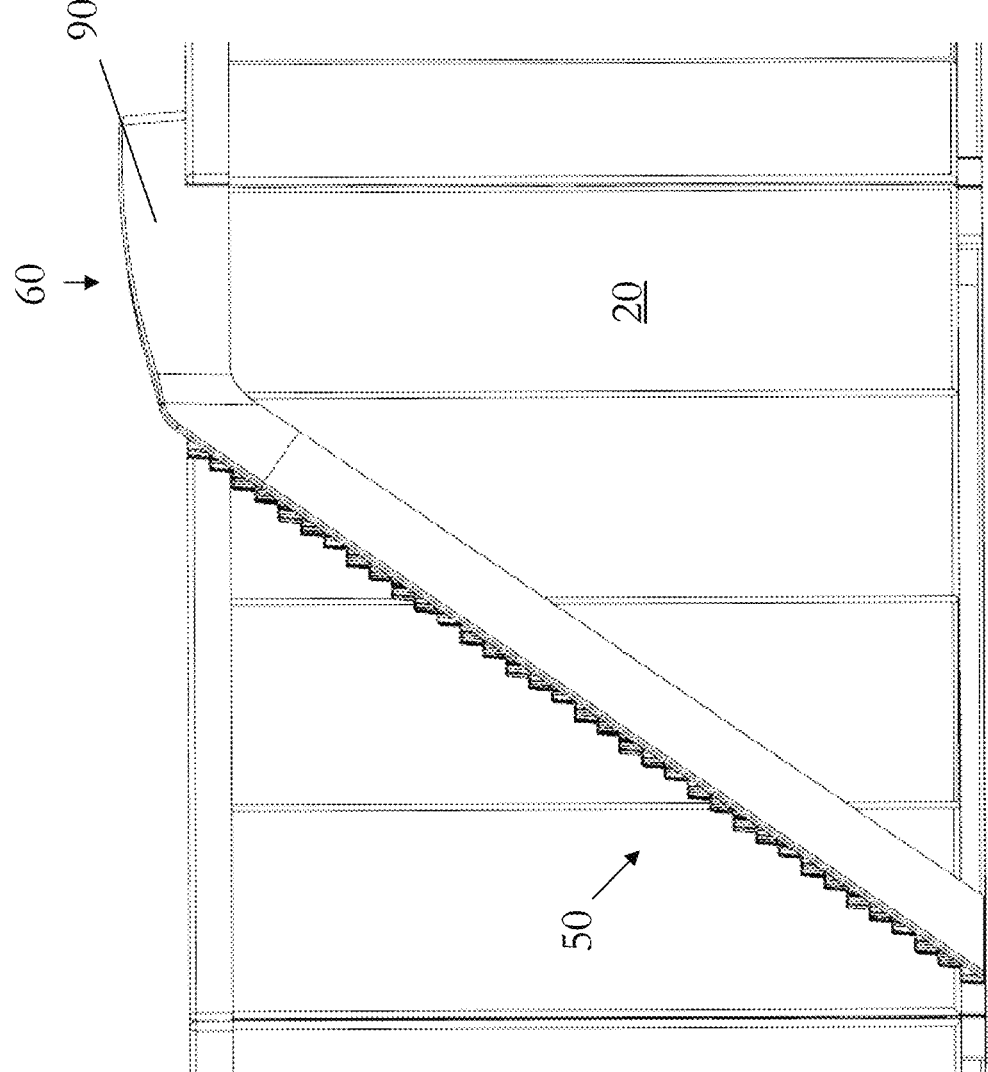
FIG. 2 is an elevational view of a portion of the pond of FIG. 1.

The first, outside set of steps 50 is shown in elevational view in FIG. 2. The steps 50 are arranged on the outside of a section of side wall 20. The barrier around the second crossing area 60 at the top of the steps 50. The barrier cannot be seen above the level of the steps due to the angle of view in this Figure.

Figure 3:
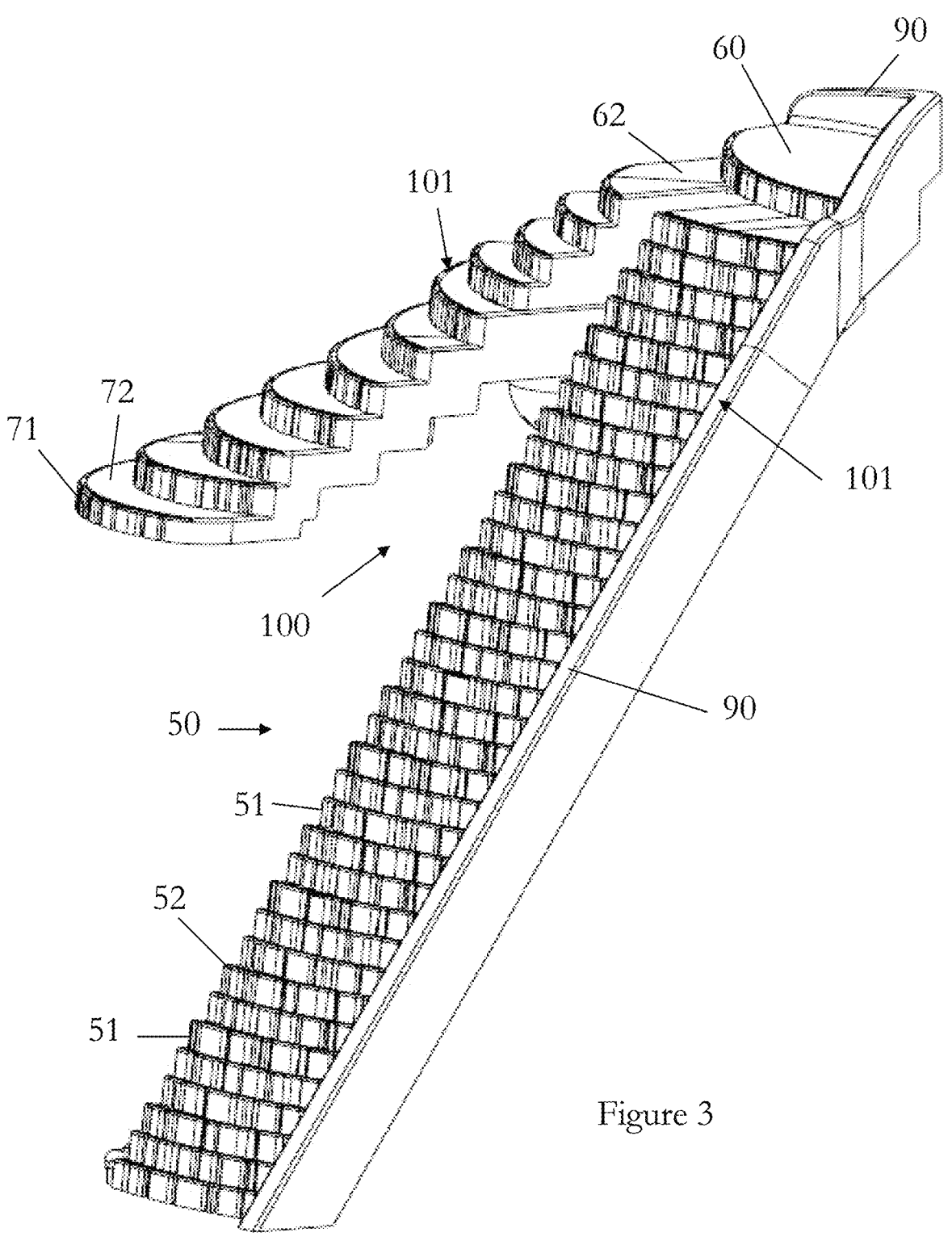
FIG. 3 is a perspective view of wildlife access steps.

The first 50 and second 70 sets of steps may be arranged to be connected together, as shown in FIG. 3. They are also shown connected to the second crossing area 60. The three items may be connected together to form a structure which may then be arranged over the rail 25. A gap 100 for where the rail 25 and side wall section 20 would fit is shown between the first 50 and second 70 sets of steps.

The first set of steps 50 includes a plurality of risers 51 and treads 52. The second set of steps 70, likewise, includes a plurality of risers 71 and treads 72.

The barrier 90 is visibly higher than the treads 52 of the first set of steps 50.

In use, the water level may reach approximately half-way up the height of the second set of steps as indicated by arrows 101. In such circumstances, the steps in the second set of steps 70 below the water level may be regarded as a "beach area" that allows egress from the water for amphibians and other relatively small animals and insects. The treads of the beach rea are deep enough horizontally to allow birds to bathe and stretch their wings and splash at a comfortable depth.

The steps in the second set of steps 70 above the water level may be regarded as a "landing area" that allows birds and insects to land on the dry before walking down to the edge of the water and down to a comfortable depth to drink or bathe.

Figure 4:
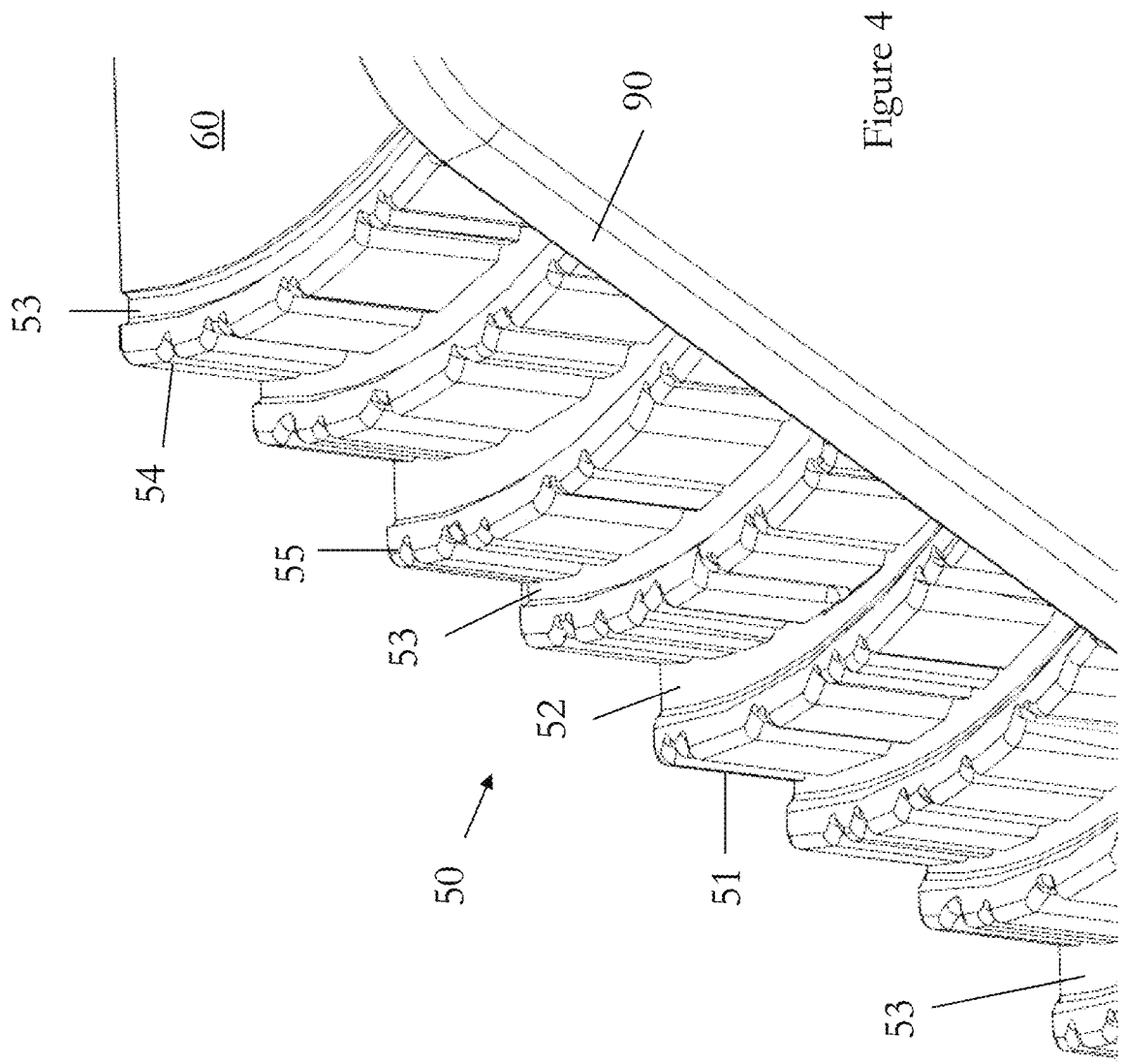
FIG. 4 is a perspective view of a portion of the steps of FIG. 3.

An enlarged view of a section of the first set of steps 50 is shown in FIG. 4. As may be seen, the outer surface of the risers 51 include grooves 54. These are to create a bark-like effect but may also act as gripping points for wildlife. Each tread 52 also includes a groove 53 in its upper surface. The grooves 53 are shown being located between the noses 55 of the treads and the base of the adjacent riser 51. These act as gripping points for wildlife.

The barrier 90 is, again, visibly higher than the treads 52 of the first set of steps 50.

Figure 5:
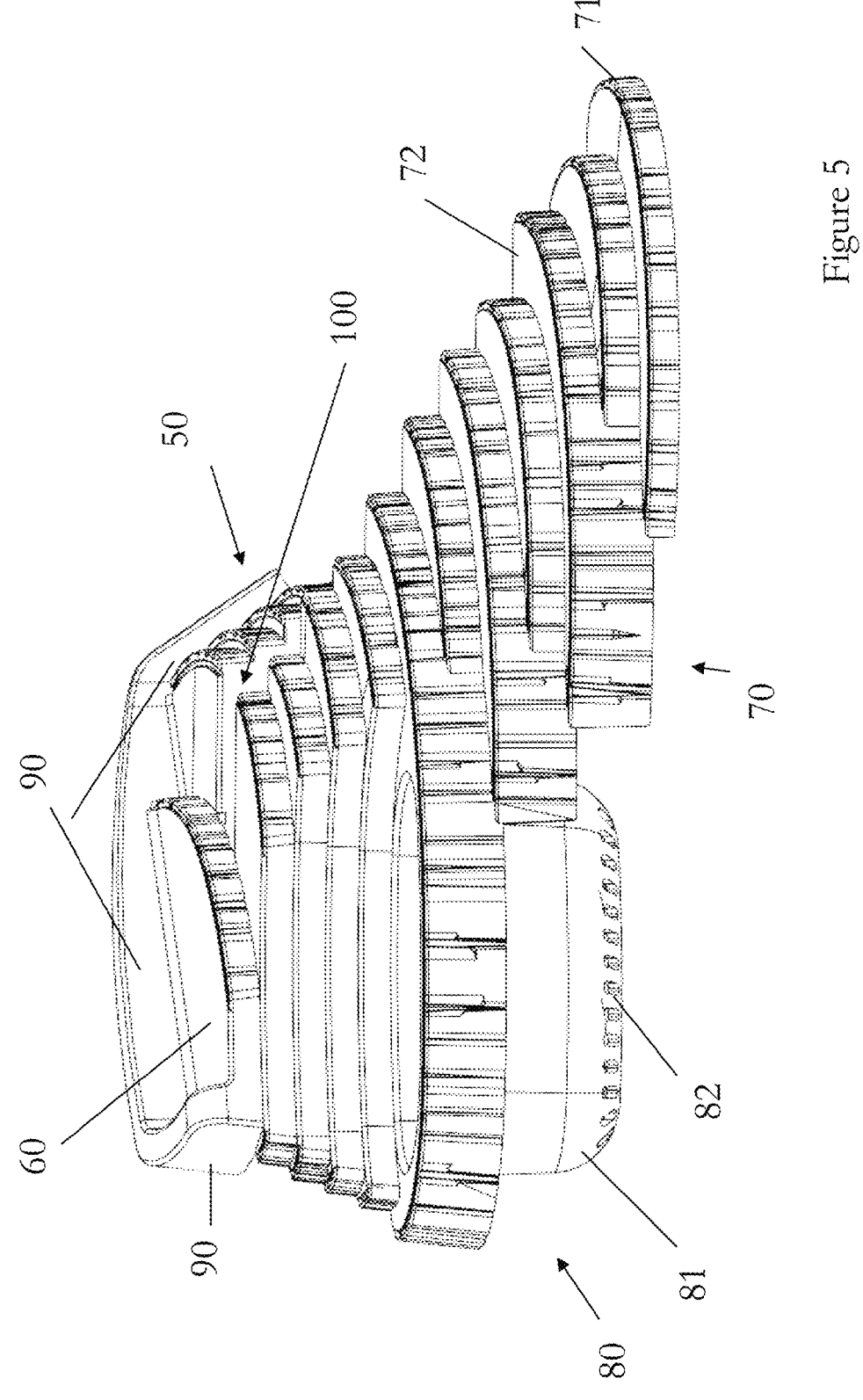
FIG. 5 is another perspective view of the wildlife access steps of FIG. 3.

A portion of the structure described above in relation to FIG. 3 is shown in FIG. 5 from a different view point. Not all of the outside set of steps 50 are shown as these have been detached.

The inside set of steps 70 has visibly deeper treads 72 than the outside set of steps 50. These may allow wildlife to reach the water. The gap 100 where the side wall 20 and rail 25 may reside, in use, is visible between the inside and outside sets of steps.

The planter 80 is visible in front of the inside sets of steps 70. It includes a basket-like feature 81 which includes holes 82 at its base to allow water to flow through the basket.

The invention claimed is:

1. A free-standing frog pond, for allowing access to the pond by frogs, comprising:
   side walls;
   a substantially continuous rail at the top of the side walls, wherein the rail has a top;
   a first staircase leading up outside the pond;
   a second staircase leading down inside the pond, wherein the first and the second staircases each include a top, treads, and risers; and
   a first crossing area formed by the top of the rail, wherein a tread of the first staircase is substantially level with the top of the rail and has a depth substantially greater than a depth of each of the other treads of the first staircase, and wherein a tread of the second staircase is substantially level with the top of the rail and has a depth substantially greater than a depth of each of the other treads of the second staircase;
   a second crossing area joining the top of the first and second staircases, and wherein the risers of the first and the second staircases include grooves, wherein a depth of the treads of the second staircase are substantially greater than a depth of the treads of the first staircase, and wherein at least some of the treads of the first staircase are arranged to be grippable by frogs, in use.

2. The free-standing pond of claim 1, wherein at least some of the treads of the second staircase are arranged to be grippable by frogs.

3. The free-standing pond of claim 1, wherein the treads include planar surfaces, noses, and an indentation in the planar surfaces arranged behind, and adjacent, the noses of the treads.

4. The free-standing pond of claim 1, wherein a pitch of the first staircase is 30 to 60 degrees above horizontal.

5. The free-standing pond of claim 1, wherein a pitch of the first staircase is 45 to 55 degrees above horizontal.

6. The free-standing pond of claim 1, wherein the treads of the first staircase have a depth of 5 to 15 mm.

7. The free-standing pond of claim 1, wherein the risers of the first staircase have a height of 10 to 25 mm.

8. The free-standing pond of claim 1, further comprising:
   a barrier along an outside edge of the first staircase.

9. The free-standing pond of claim 1, further comprising:
   a barrier along an outside edge of the crossing area.

10. The free-standing pond of claim 1, wherein the first and second staircase, the crossing area, are all arranged to be releasably connectable to one another.

11. The free-standing pond of claim 1, further comprising a planter inside the pond and adjacent the second staircase.

12. The free-standing pond of claim 11, further arranged such that the planter is releasably connectable to the first and second staircase, and the crossing area.

13. The free-standing pond of claim 1, further comprising: a liner and a fountain.

\* \* \* \* \*